United States Patent [19]

Weiser et al.

[11] Patent Number: 5,265,213
[45] Date of Patent: Nov. 23, 1993

[54] PIPELINE SYSTEM FOR EXECUTING PREDICTED BRANCH TARGET INSTRUCTION IN A CYCLE CONCURRENTLY WITH THE EXECUTION OF BRANCH INSTRUCTION

[75] Inventors: Uri C. Weiser; David Perlmutter; Yaakov Yaari, all of Haifa, Israel

[73] Assignee: Intel Corporation, Santa Clara, Calif.

[21] Appl. No.: 625,761

[22] Filed: Dec. 10, 1990

[51] Int. Cl.⁵ .............................................. G06F 9/38
[52] U.S. Cl. ............................. 395/375; 364/229.2; 364/231.8; 364/261.3; 364/261.7; 364/DIG. 1
[58] Field of Search ................. 395/375, 400, 425, 800

[56] References Cited

U.S. PATENT DOCUMENTS

| | | | |
|---|---|---|---|
| 4,084,226 | 4/1978 | Anderson et al. | 395/400 |
| 4,725,947 | 2/1988 | Shonai et al. | 395/375 |
| 4,777,587 | 10/1988 | Case et al. | 395/375 |
| 4,837,681 | 6/1989 | Fuller | 395/375 |
| 4,847,753 | 7/1989 | Matsuo et al. | 395/375 |
| 4,858,104 | 8/1989 | Matsuo et al. | 395/375 |
| 4,912,635 | 3/1990 | Nishimukai et al. | 395/375 |
| 4,926,323 | 5/1990 | Baror et al. | 395/375 |
| 4,942,525 | 7/1990 | Shintani et al. | 395/375 |
| 4,974,155 | 11/1990 | Dulong et al. | 395/375 |
| 5,131,086 | 7/1992 | Circello et al. | 395/375 |
| 5,136,697 | 8/1992 | Johnson | 395/375 |
| 5,142,634 | 8/1992 | Fite et al. | 395/375 |
| 5,163,140 | 11/1992 | Stiles et al. | 395/425 |

*Primary Examiner*—Robert B. Harrell
*Assistant Examiner*—Alpesh M. Shah
*Attorney, Agent, or Firm*—Blakely, Sokoloff, Taylor & Zafman

[57] ABSTRACT

A pipeline instruction processor for executing instructions stored in an instruction memory, including a plurality of branch instructions. The instruction processor includes a branch target buffer which contains target instructions and target addresses corresponding to branch instructions. The target instruction data is indexed according to the address of the instruction which precedes the branch instruction. Also included in the branch target buffer is history data indicating whether the branch was taken. The instruction processor also includes two execution units. The present invention employs logic which allows a branch instruction and its target instruction stored in the branch target buffer to be executed concurrently in the two execution units according to the history data stored in the branch target buffer. Since the branch instructions and their target instructions are executed during the same cycle, branch instructions appear to be executed in zero cycles.

11 Claims, 6 Drawing Sheets

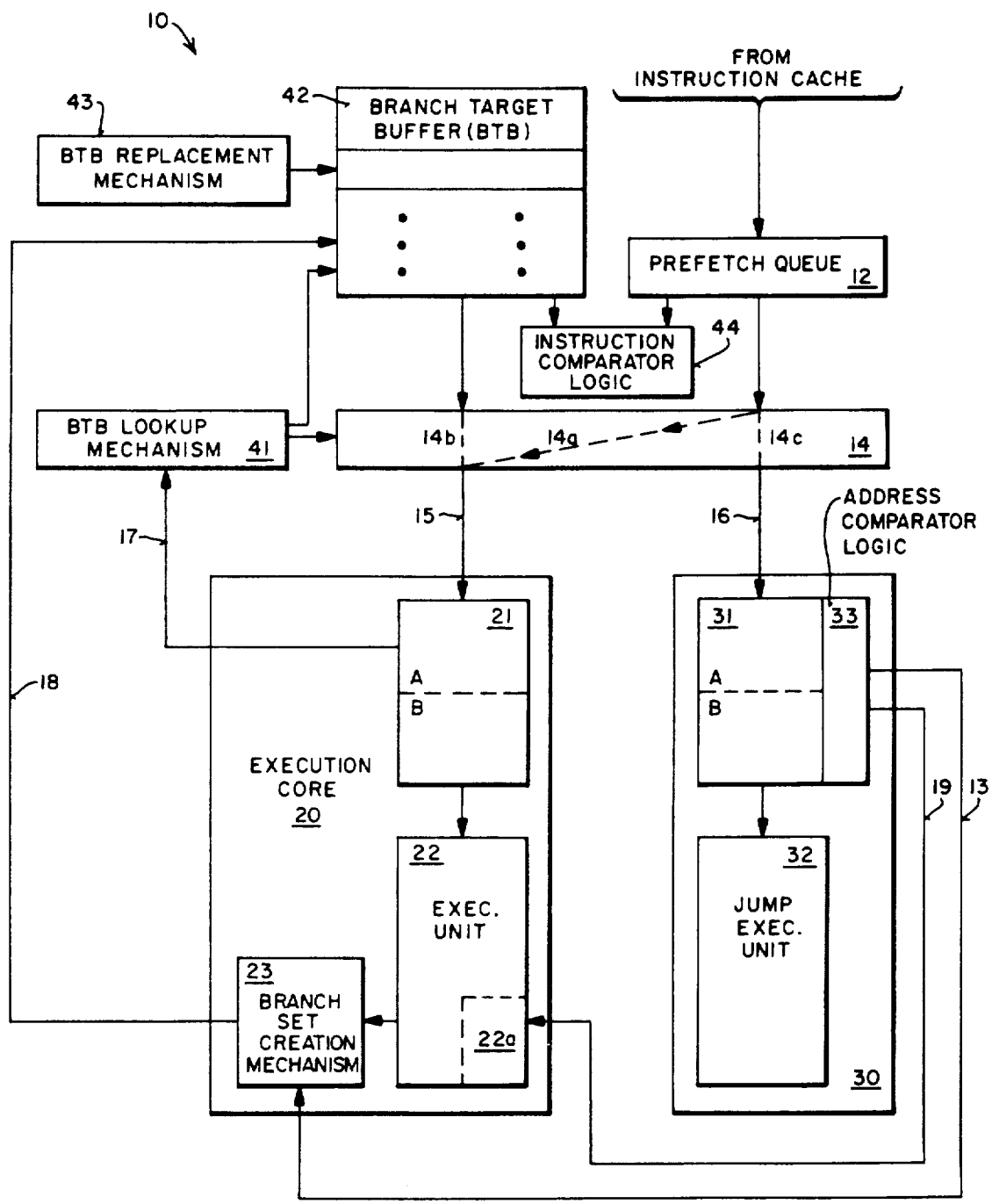

FIG_2

| TAG | DATA | | STATUS | |
|---|---|---|---|---|
| | n+1 | IPn+1 | H | V |
| IPn-1 | | | | |
| 32 | 24 | 32 | 2 | 1 |

IPn-1 — INSTRUCTION POINTER TO THE INSTRUCTION PRECEDING THE BRANCH
n+1 — THE TARGET INSTRUCTION
IPn+1 — INSTRUCTION POINTER OF THE TARGET INSTRUCTION
H — 2 BIT HISTORY
V — VALID BIT

FIG_4  JCC EXECUTION TIME

| BTB HIT | BRANCH | | EXECUTION TIME | |
|---|---|---|---|---|
| | PREDICTION TAKEN(T)/NOT TAKEN(N) | ACTUAL TAKEN(T)/NOT TAKEN(N) | W/ BTBFF (CYCLES) | W/O BTBFF (CYCLES) |
| 1 | NOT TAKEN | NOT TAKEN | 0 | 1 |
| 1 | NOT TAKEN | TAKEN | 3 | 3 |
| 1 | TAKEN | NOT TAKEN | 3 | 1 |
| 1 | TAKEN | TAKEN | 0 | 3 |
| 0 | NOT TAKEN | NOT TAKEN | 1 | 1 |
| 0 | NOT TAKEN | TAKEN | 3 | 3 |

FIG—3 JCC TIMING FLOW

JCC PREDICTED TAKEN EXAMPLE

| | 51 {t₀} | | 52 {t₁} | | 53 {t₂} | | 54 {t₃} | | 55 {t₄} | | 56 {t₅} | | 57 {t₆} | | {t₇} |
|---|---|---|---|---|---|---|---|---|---|---|---|---|---|---|---|
| | PH1 | PH2 | PH1 | PH2 | PH1 | PH2 | PH1 | PH2 | PH1 | PH2 | PH1 | PH2 | PH1 | PH2 | PH1 |
| PREFE TAKQ | | | | | | n+1 | | | | | CORRECT PREDICTION | | | | |
| NOTAKQ | | | | | | (n+1) | | | | | WRONG PREDICTION | | | | |
| BTB | | | IPn−1→n+1 | | | | | | | | | | | | |
| ID1.J | n−2 | | n−1 | | n | | | | | | | | | | |
| ID1 | | | | | n+1 | n+1 | n+2 | | n+3 | | n+4 OR (n+1) | | | | |
| ID2.J | | | | | | | n | | | | | | | | |
| ID2 | | | n−2 | | n−1 | n−1 | n+1 | | n+2 | | | | | | |
| ILAGEN | | | | IPn+1 | | | | | | | | | | | |
| DLAGEN | | | | IPn−2 | | n−1 | | n+1 | | n+2 | | | | | |
| DJ | | | | | | | | | FLAG CHK | | | | | | |
| TLB/IC | | | | | n+1 | n+1 | | | n | | | | | | |
| TLB/DC | | | | | n−2 | n−2 | n−1 | | n+1 | | | | | | |
| D(E) | | | | | n−2 | n−2 | n−1 | | n+1 | | | | | | |
| WB | | | | | | | | | | | n+1 OR NOP | | | | |

FIG. 5  JMP TIMING FLOW

JUMP TIMING — JUMP EXAMPLE

FIG_6 JMP EXECUTION TIME

| BTB HIT | BRANCH | | EXECUTION TIME | |
|---|---|---|---|---|
| | PREDICTION TAKEN(T) / NOT TAKEN (N) | ACTUAL TAKEN(T) / NOT TAKEN (N) | W/ BTBFF (CYCLES) | W/O BTBFF (CYCLE) |
| 1 | — | — | 0 | 3 |
| 0 | — | — | 3 | 3 |

FIG_7 RET EXECUTION TIME

| BTB HIT | BRANCH | | EXECUTION TIME | |
|---|---|---|---|---|
| | PREDICTION TAKEN(T) / NOT TAKEN (N) | ACTUAL TAKEN(T) / NOT TAKEN (N) | W/ BTBFF (CYCLES) | W/O BTBFF (CYCLES) |
| 1 | "RIGHT" | — | 2 | 5 |
| 0 | "WRONG" | — | 5 | 5 |
| 0 | — | — | 5 | 5 |

FIG_7 RET TIMING FLOW

RET TIMING — RET EXAMPLE

| | 71 | | 72 | | 73 | | 74 | | 75 | | 76 | | 77 | | 78 | |
|---|---|---|---|---|---|---|---|---|---|---|---|---|---|---|---|---|
| | $t_0$ | | $t_1$ | | $t_2$ | | $t_3$ | | $t_4$ | | $t_5$ | | $t_6$ | | $t_7$ | $t_8$ |
| | PH1 | PH2 | PH1 | PH2 | PH1 | PH2 | PH1 | PH2 | PH1 | PH2 | PH1 | PH2 | PH1 | PH2 | PH1 | PH2 |
| PREFE | | | | | | | | | | | | | | | | |
| TAKQ | | | | | | | | | | | | | | | | |
| NOTAKQ | | | | | | | | | | | | | | | | |
| BTB | | | | IPn-1→n+1 | | n+1 | | | | | | | | | | |
| ID1.J | n-2 | | n-1 | | n | | | | | | | | | | | |
| ID1 | | | | | | n+1 | | | | n+2 | | n+3 | | | | n+4 or NEW |
| ID2.J | | | n-2 | | n-1 | | n | | | | | | | | | |
| ID2 | | | | | | n-1 | | | | n+1 | | n+2 | | n+2 | | |
| ILAGEN | | | | | | | | | | n | | | | | | |
| DLAGEN | | | | | n-2 | n-1 | | n | | n+1 | n | | | | | |
| DJ | | | | | | | | | | n | | | | | | |
| TLB/IC | | | | | | | | n-1 | | | | | n | | | |
| TLB/DC | | | | | | n-2 | n-2 | n-1 | | | | | n+1 | n+1 or NOP | n+2 or NOP | |
| D(E) | | | | | | | n-2 | | n-1 | | | | | | | |
| WB | | | | | | | | | n-1 | | | | | | | n+1 or NOP |

PIPELINE SYSTEM FOR EXECUTING PREDICTED BRANCH TARGET INSTRUCTION IN A CYCLE CONCURRENTLY WITH THE EXECUTION OF BRANCH INSTRUCTION

FIELD OF THE INVENTION

This invention relates to a method and apparatus for processing instructions in a digital computer and, more particularly, for minimizing the delays associated with processing branch instructions in a pipeline.

BACKGROUND OF THE INVENTION

In computers, branch instructions influence the flow of instruction execution. Many complex instruction set computers (CISC) as well as reduced instruction set computers (RISC) utilize simple decoding and pipelined execution of instructions. A branch instruction in a pipelined computer normally breaks the pipeline until the instruction at the location to which the branch instruction transferred control, the "target instruction," is fetched. As such, these branch instructions impede the normal pipeline flow of instructions. In fact, execution of a branch instruction sometimes consumes about thirty percent of the executed cycle time in CISC and RISC microprocessors.

In the prior art, a number of solutions to this problem have been implemented. One such solution is the use of a branch target buffer which stores the address of the target instruction. The target instructions stored in the branch target buffer are indexed according to the address of the branch instruction. When a branch instruction is being decoded, the branch target buffer is searched for the address of the branch instruction. If the address is found, the target instruction at the target address stored in the branch target buffer is fetched so that upon the execution of the branch instruction, the target instruction is ready for decoding. Later versions of branch target buffers even included the storage of the target instruction. See U.S. Pat. No. 4,725,947. For either type of branch target buffer, the target instruction is executed following the execution of the branch instruction.

In the prior art, a branch folding (BF) technique enables the "folding" of two instructions together. This technique enables parallel execution of two types of instruction: the branch instruction and a non-branch instruction that precedes it. One limitation with this technique is that it cannot be utilized where two branch instructions follow one after the other.

Another limitation is that conditional branch instructions usually rely on the result of the execution of the previous instruction before any determination can be made of whether or not to branch. Once execution of the preceding instruction has been completed, the state of the condition is known, and the branching can occur. Even if the target instruction is available immediately after decoding the conditional branch instruction, the determination of whether to begin decoding, and thereafter executing, the target instruction or to continue in the execution of instructions following the branch instruction in the instruction memory cannot be made until the conditional branch instruction is executed. Since conditional branch instructions must wait for the execution of the instruction which precedes it, branch folding with conditional branch instructions could result in incorrect branches.

In the prior art, a variety of methods have been employed to minimize the effect of conditional branching instructions. One such technique involves inputting a delay instruction immediately following the branch instruction in the pipeline. See U.S. Pat. No. 4,777,587. This allows the branch instruction to be executed and the branching determination to occur while the delay instruction is being decoded. Once execution of the branch instruction is complete, the determination of whether to branch can be known. Therefore, once the delay instruction has completed execution, the instruction processor can input the correct instruction into the decoder depending on whether the condition was satisfied. Even with the pipeline execution being uninterrupted, the delay associated with executing the branch instruction and the added delay of the delay instruction slow the instruction execution.

Other techniques to minimize the effect of conditional branching instructions include predicting the occurrence of branches ahead of time (based on the history of that branch) and correcting for wrong predictions, or fetching multiple instructions until the direction of branch is ascertained, or delaying the effect of branches. However, the overall delay in executing the branch instruction remains.

Accordingly, the present invention provides a device and method which minimizes the delays branch instructions create in pipeline instruction processors and, in some cases, eliminates entirely the delay associated with the execution of a branch instruction, conditional or otherwise.

SUMMARY OF THE INVENTION

An instruction processor device and method is described which executes instructions stored in an instruction memory, including the execution of a branch instruction and its target instruction concurrently. The instruction processor includes a branch target buffer which contains target instructions and target addresses corresponding to branch instructions. The target instruction data is indexed according to the address of the instruction which precedes the branch instruction. Also included in the branch target buffer is history data indicating whether the branch was taken. The instruction processor includes a prefetcher for prefetching instructions from memory so that they may be executed. The instruction processor also includes a first decoder which decodes instructions which are then executed by a first execution apparatus.

While decoding an instruction, a logic apparatus searches the branch target buffer for the address of the instruction to determine if a branch instruction is to follow it. If no match is found, the logic apparatus directs a multiplexer to direct the next instruction from the prefetcher to the first decoder for execution by the first execution unit. If a match is found, a branch instruction (or possible other instruction) follows the instruction currently being decoded in the first decoder and the logic apparatus generates a predicted target instruction and its address for the branch from the information stored in the branch target buffer. The logic apparatus then directs the multiplexer to channel the next instruction, the branch instruction, to a second execution apparatus, via a second decoder, and the predicted target instruction to the first execution apparatus, via the first decoder, such that both the branch instruction and target instruction are executed during the same cycle. Therefore, the branch instruction appears to executed in zero cycles.

The second execution apparatus also includes comparing logic for generating the actual branch target instruction for the branch instruction and comparing the actual branch target with the predicted target instruction fetched from the branch target buffer and for comparing the target address of the actual branch instruction to which branching occurred with the predicted branch target address from the branch target buffer. If either the actual target instruction is not identical to the predicted target instruction from the branch target buffer or said actual target instruction address is not identical to the predicted branch target instruction address then the comparing logic sends a "halt" signal to the first execution apparatus and a fetch signal to the prefetcher indicating that the prefetcher is to fetch the actual branch target instruction at the actual branch target instruction address. The first execution apparatus, upon receiving the halt signal, aborts the execution of the predicted target instruction.

BRIEF DESCRIPTION OF DRAWINGS

FIG. 1 is a block diagram of the instruction processor architecture of the present invention.

FIG. 2 illustrates the format of each individual entry in the branch target buffer of the present invention.

FIG. 3 is a timing diagrams of the pipeline stages during the processing of a conditional branch (JCC) instruction.

FIG. 4 illustrates a comparison of the execution time of a JCC instruction by instruction processors using and not using branch target buffers with forward folding.

FIG. 5 is a timing diagram of the pipeline stages during the processing of a jump (JMP) instruction.

FIG. 6 illustrates a comparison of the execution time of a JMP instruction by instruction processors using and not using branch target buffers with forward folding.

FIG. 7 is a timing diagram of the pipeline stages during the processing of a return (RET) instruction.

FIG. 8 illustrates a comparison of the execution time of a RET instruction by instruction processors using and not using branch target buffers with forward folding.

DETAILED DESCRIPTION OF THE INVENTION

An instruction processor and method for executing instructions stored in an instruction memory and particularly for executing certain branch instructions in zero cycles is described. In the following description, numerous specific details are set forth such as specific computer components, bit lengths, etc., in order to provide a thorough understanding of the present invention. It will be obvious, however, to one skilled in the art that the present invention may be practiced without these specific details. In other instances, well-known components, structures and techniques have not been shown in detail to avoid unnecessarily obscuring the present invention.

OVERVIEW OF THE PRESENT INVENTION

The overall concept of the Extended Branch Target Buffer (BTB) is to issue and execute a control flow (CF) instruction (e.g., JCC, JMP, RET, CALL) in parallel with the branch target instruction. (The specific instructions discussed are for the Intel Corporation "X86" family of processors. It will be obvious to one skilled in the art that the invention is not limited to these processors). The branch target buffer contains both the target instruction and its address and using a technique called "forward folding," simultaneously executes both the control flow instruction and its target instruction.

An overall block diagram of the present invention, instruction processor 10, is shown in FIG. 1. Although applicable to other architectures, Instruction processor 10 represents the instruction processor currently used in the Intel 486 microprocessor. During a normal instruction execution, instructions are fetched by prefetch queue 12 from the instruction cache, not shown, on path 11 and stored in a prefetch buffer. Prefetch queue 12 sends the instructions to multiplexer 14 which directs the instructions via path 14a to execution core 20. The instructions enter execution core decoder 21 via path 15. The prefetch queue prefetches an instruction cache line (which contains several instructions), whenever a space (a line length) is available. After being decoded, core decoder 21 sends the instructions to execution unit 22 for execution. While an individual instruction is being executed, the second instruction is fetched from prefetch queue 12 by the core decoder 21.

Core decoder 21 is a two stage decoder. During the first stage of decoding in core decoder 21, the address of the instruction is generated. The branch target buffer (BTB) lookup mechanism 41, responsive to the initial decoding of an instruction in core decoder 21, searches branch target buffer (BTB) 42 for the address of the instruction being decoded.

Branch target buffer (BTB) 42 holds, for instance, 64 separate branching sets of data referred to as control flow branch sets (CFS). The structure of each branch set is shown in FIG. 2 and includes in the currently preferred embodiment: 32 bits of the instruction address of the instruction just prior to the branch instruction (IPn−1), the first three bytes (24 bits) of the predicted branch target instruction (n+1), the instruction address of the predicted branch target instruction (IPn+1), 2 bits of history (H) and a valid bit (V).

The branch prediction of the target instruction and the target instruction address is based on branch history. BTB lookup mechanism 41 uses the previous sequence of whether each branch was taken or not to predict whether or not the branch will be taken the next time. The valid bit indicates the validity of the entry in branch target buffer 42.

Upon decoding of instruction n−1 (one instruction prior to the control flow instruction) three items are available: the address of the control flow (CF) instruction, IPn; the instruction n+1 that succeeds the control flow instruction from BTB 42; and the address of the predicted target instruction, IPn+1, from BTB 42. At the next cycle, the branch instruction and the predicted target instruction are available. The prefetching of a new cache entry that includes the address of the target instruction, IPn+1, is also performed if the history (H) bits are positive (00 or 01). The history (H) bits are always true for JMP, RET, and JCC instructions predicted as taken.

During normal operation, a stream of instructions is fetched by prefetch queue 12 from the instruction cache. The instructions are directed to execution core 20 by multiplexer 14 via path 14a. When an instruction is being decoded by core decoder 21, BTB lookup mechanism 41 searches for an entry in BTB 42 corresponding to the address of the instruction being decoded.

When BTB lookup mechanism 41 does not encounter an entry in BTB 42 during the decoding of the n−1 instruction, core decoder 21 completes decoding and the decoded instruction is executed by execution unit 22. Simultaneous with execution, the next instruction, n, is decoded in core decoder 21. If the next instruction is actually a branch instruction and, thus, has no corresponding entry in BTB 42 (since the instruction n−1 did not have a match in BTB 42), core decoder 21 decodes the branch instruction and execution unit 22 executes it. The result of the execution, namely the address of the branch target instruction, IPn+1, the first three bytes of the fetched branch target instruction, n+1, and the address of the branch instruction are kept. Branch set creation mechanism 23 stores the address of the instruction before the branch instruction (IPn−1), the first three bytes of the fetched branch target instruction (n+1), the address of the branch target instruction (IPn+1), the history bits (H) and the valid bit (V) in a branch set in BTB 42. For example, if BTB 42 is full, BTB replacement mechanism 43 randomly replaces one of the branch sets in BTB 42 with the one created by branch set creation mechanism 23. However, the replacement mechanisms need not be random.

When BTB lookup mechanism 41 encounters a matching entry in BTB 42 during the decoding of the n−1 instruction (the instruction prior to a branch instruction), a hit occurs. In this case, multiplexer 14 directs the predicted target instruction from BTB 42 to execution core 20 via paths 14b and 15. At the same time, the branch instruction is delivered from prefetch queue 12 to jump execution unit 30 via paths 14c and 16. Then forward folding is used and the two instructions are executed in parallel. Jump execution unit 30 executes the branch instruction to verify the correctness of the content of BTB 42. If the control flow set resides in BTB 42 and the target instruction is predicted correctly, branch instructions such as JCC and JMP can be executed effectively in zero cycles since execution occurs in parallel to target instruction execution.

The instruction comparator logic 44 and address comparator logic 33 in jump execution unit 30 verify the correctness of the predicted target instruction and address respectively in order to prevent wrongful execution due to an incorrect prediction or self-modifying code. Both the target instruction and the target address are checked in two separate steps. Initially, the actual target instruction is fetched from the instruction cache immediately after the matching branch set has been detected in BTB 42. Instruction comparator logic 44 compares the actual target instruction to the 24 bits of the n+1 instruction, the predicted target instruction, residing in BTB 42. If instruction comparator logic 44 encounters a mismatch, a regular fetch is started and an abort signal is sent to execution unit 22 to halt execution of the predicted branch target instruction. Secondly, the actual target address is calculated in jump execution unit 30. Address comparator logic 33 compares the calculated address with the predicted target address, IPn+1, stored in BTB 42. If address comparator logic 33 encounters a mismatch, a regular fetch is started and an abort signal is sent via path 19 to execution unit 22 to halt execution of the predicted branch target instruction. In this situation, the performance penalty of the present invention is equal to the execution time of a system not employing the extended branch target buffer. If a match occurs, no further fetching is required and execution of instructions continues from the address of the target instruction.

After execution of the branch instruction, the target instruction which was executed and its address, the address of the instruction which preceded the branch instruction, and data indicating whether the branch was taken or not are stored in the branch target buffer using branch set creation mechanism 23 (and BTB replacement mechanism 43 if BTB 42 is full).

The instruction processor is also capable of executing two branch instruction successively. When the target instruction is being decoded in core decoder 21, branch target buffer lookup mechanism is searching branch target buffer 42 for the instruction address of the target instruction. If a match is found, and, thus, indicating that a second branch instruction follows the first, a second target instruction and address corresponding to the second branch instruction are generated from branch target buffer 42. As in the case of the first branch instruction, the second branch instruction and the second predicted branch instruction are directed to jump execution core 30 and execution core 20 respectively. Execution unit 22 executes the second target instruction while jump execution unit 32 executes the second branch instruction. The performance advantages for the two successive branch instruction execution is the same as the single branch instruction execution.

EXAMPLES OF THE OPERATION OF THE PRESENT INVENTION

Figure 5:
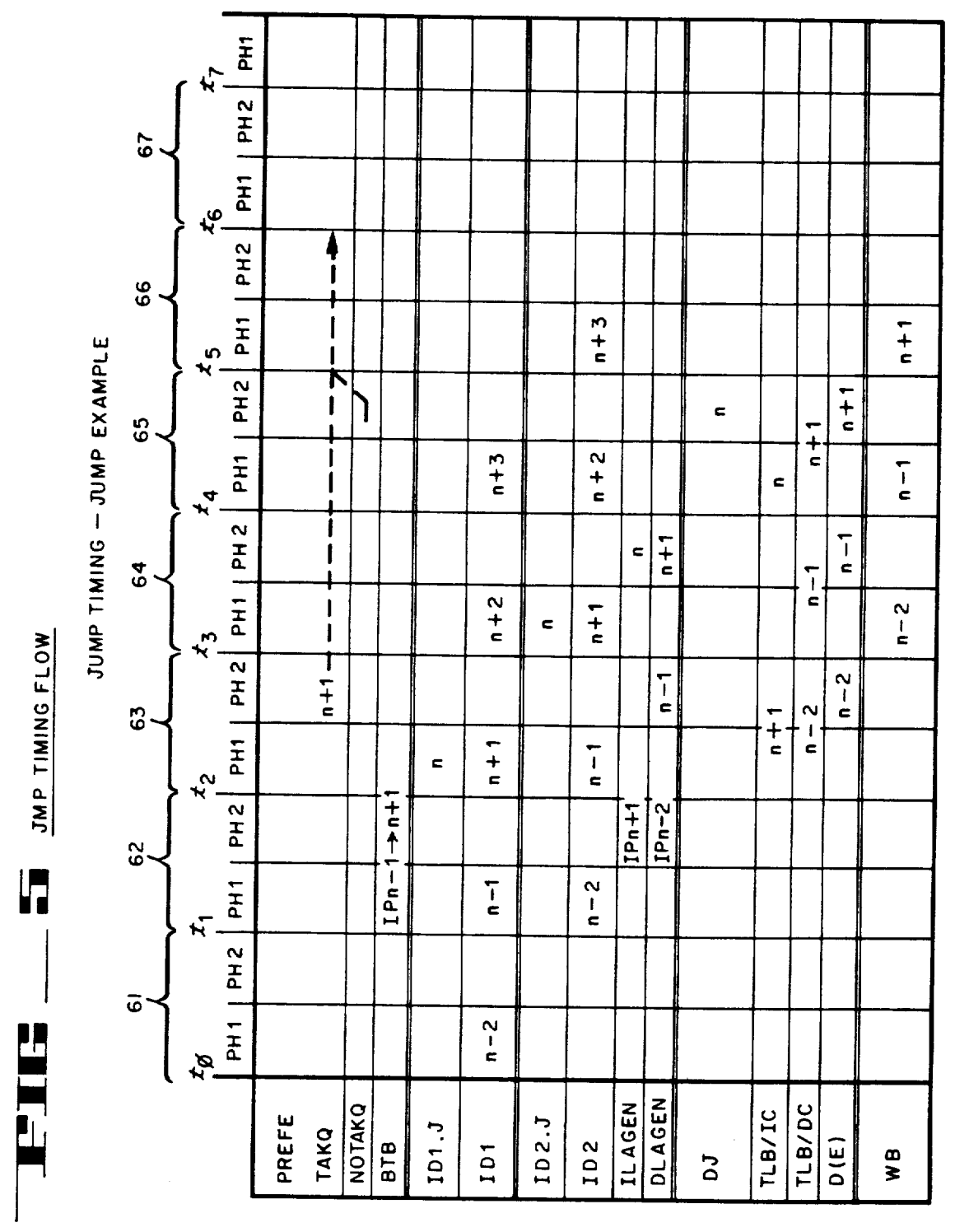

The branch target buffer of the currently preferred embodiment involves three classes of instructions: JCC, JMP and RET. JCC is a conditional jump wherein if the condition is met, instruction processor 10 branches to the target address. An example of the timing flow for the execution of a JCC instruction with the branch predicted as taken by the BTB is shown in FIG. 3. FIG. 4 shows a comparison of the execution times of the JCC command in systems using and not using a branch target buffer with forward folding. The JMP instruction is an unconditional jump which transfers program control to a different instruction without storing any return information. A timing flow example of the JMP instruction execution by instruction processor 10 is shown in FIG. 5. FIG. 6 shows a comparison of the execution times of the JMP command in systems using and not using a branch target buffer with forward folding. A RET instruction allows the instruction processor to continue the execution of a program by transferring control of the program to a return address that was pushed onto the program stack. A timing flow example of the RET instruction execution by instruction processor 10 is shown in FIG. 7. In this example, all of the instructions at each stage are executed in one cycle. FIG. 8 shows a comparison of the execution times of the RET command in systems using and not using a branch target buffer with forward folding.

Referring to FIG. 3, the instruction n−2 that precedes the instruction which precedes the branch instruction is in the first stage of core decoder 21 (ID1) in execution core 20 during the first phase (PH1) of the first cycle, $t_0$-$t_1$ (shown by bracket 51).

During the first phase of the second cycle, $t_1$-$t_2$ (shown by bracket 52), the n−2 instruction continues decoding in the second stage of the core decoder 21 (ID2). Simultaneously, the instruction n−1 that precedes the branch instruction is in the first stage of core decoder 21. Also during the first phase of the second cycle, lookup mechanism 41 locates the branch set for the n−1 instruction in branch target buffer 42 to generate the predicted target instruction, n+1 and the address of the target instruction n+1. Additionally, during the second phase (PH2) of the second cycle, the linear address is calculated (ILAgen) for the fetch of the predicted target instruction n+1 and the linear address is calculated (DLAgen) for the data fetch instruction n−2.

During the first phase of the third cycle, $t_2$-$t_3$ (shown by bracket 53), the instruction n−1 preceding the branch instruction continues decoding in the second stage of core decoder 21 (ID2). At the same time, the branch instruction n and the predicted target instruction n+1 begin initial decoding in the first stage of jump execution core 30 and execution core 20 respectively. Also during the third cycle, the physical address is generated from the virtual address in the translation look-aside buffer and a fetch from the data cache occur for the n−2 instruction (TLB/DC). Similarly, the physical address is generated for the predicted target instruction n+1 and a fetch of a cache line, that includes the instruction n+1, from the instruction cache occurs (TLB/IC). This instruction is compared, during the following cycle, with the branch target buffer entry that holds the n+1 instruction, for consistency (the comparison being performed in block 33). The not taken target instruction (n+1) appears in the notakQ of the prefetch which represents the queue of sequential stream of instructions following the branch instruction n. Additionally during the second phase of the third cycle, the linear address is calculated for the data fetch instruction n−1 preceding the branch instruction n and instruction n−2 is executed (D(E)).

During the first phase of the fourth cycle, $t_3$-$t_4$ (shown by bracket 54), the branch instruction n and the predicted target instruction n+1 continue decoding in the second stage of jump decoder 31 and core decoder 21 respectively. Since the cache line (that includes instruction n+1, and most probably instruction n+2) was fetched in the previous cycle, the instruction n+2 following the target instruction can also enter the first stage of decoding in core decoder 21. Also, during the second phase of the fourth cycle, the linear address of the branch target instruction is generated (ILAgen), and the linear address for the data fetch for instruction n+1 is generated (DLAgen). The physical address generation of the memory access (if needed) and the data cache fetch occur for the instruction n−1 preceding the branch instruction n during both phases of the fourth cycle, and the instruction n−1 is executed (D(E)) by core execution unit 22.

During the first phase of the fifth cycle, $t_4$-$t_5$ (shown by bracket 55), the instruction n+3 begins decoding in the first stage of core decoder 21 while instruction n+2 continues decoding in the second stage. Also during the first phase, physical address generation occurs for the target address of the branch instruction n (TLB/IC). This target address is compared with the branch target buffer address for consistency. Jump execution unit 32 checks the flag and executes the branch instruction n (DJ). Physical address generation and its corresponding data cache fetch occur for instruction n+1 (when instruction n+1 is a memory instruction and requires it) during the fifth cycle (TLB/DC), and it is executed (D(E)) during the second phase of the fifth cycle. Therefore, during the same cycle, both the branch instruction n and the predicted target instruction n+1 were executed simultaneously.

During the sixth cycle, $t_5$-$t_6$ (shown by bracket 56), either instruction n+4 or the not taken instruction (n+1) enter the first stage of core decoder 21. If the branch target buffer prediction was correct, instruction n+4 is decoded. If the prediction was incorrect, the not taken branch instruction (n+1) is decoded.

The JCC execution time is presented in FIG. 4. The BTB hit column indicates a match (1) or miss (0) in the branch target buffer. The prediction column indicates whether or not the prediction was taken or not-taken. The actual branch appears in the column Actual (T for taken and N for not-taken). The last two columns compares the execution time in cycles for systems employing branch target buffers and folding forward to those systems which do not. As shown, when a branch prediction was made based on a match in the branch target buffer and the prediction was correct, either one or three cycles were saved. When the branch was predicted as not taken and actually was to be taken, the system executes the branch instruction in the same amount of time. The only branch penalty occurs when the branch was predicted as taken and in actuality was not taken. In this situation, a system without a BTB employing forward folding would normally execution a not-taken JCC instruction in one cycle, but it must use three cycles now. Since the correct prediction probability is high, the degradation of performance caused by a wrong not-taken branch is minimal.

The JMP instruction timing flow is shown in FIG. 5 and is identical to the timing flow shown of the JCC instruction in FIG. 3 with the exception of the taken/not taken possibility. In the case of the JMP instruction, the JMP target address is always predicted right. However, before control is transferred from the JMP instruction, the address of the JMP requires evaluation and comparison with the address which resides in the branch target buffer. Referring now to FIG. 5, the instruction n−2 that precedes the instruction which precedes the branch instruction is in the first stage of core decoder 21 (ID1) in execution core 20 during the first phase (PH1) of the first cycle, $t_0$-$t_1$ (shown by bracket 61).

During the first phase of the second cycle, $t_1$-$t_2$ (shown by bracket 62), the n−2 instruction continues decoding in the second stage of the core decoder 21 (ID2). Simultaneously, the instruction n−1 that precedes the branch instruction is in the first stage of core decoder 21. Also during the first phase of the second cycle, lookup mechanism 41 locates the branch set for the n−1 instruction in branch target buffer 42 to generate the predicted target instruction, n+1 and the address of the target instruction n+1. Additionally, during the second phase (PH2) of the second cycle, the linear address is calculated (ILAgen) for the fetch of the predicted target instruction n+1 and the linear address is calculated (DLAgen) for the data fetch instruction n−2.

During the first phase of the third cycle, $t_2$-$t_3$ (shown by bracket 63), the instruction n−1 preceding the branch instruction continues decoding in the second stage of core decoder 21 (ID2). At the same time, the branch instruction n and the predicted target instruction n+1 begin initial decoding in the first stage of jump execution core 30 and execution core 20 respectively. Also, during the third cycle, physical address generation and a fetch to the data cache occur for the n−2 instruction (TLB/DC). Also during the third cycle, a fetch of a cache line, that includes the instruction n+1, occurs, while its physical address is generated in the translation look-aside buffer (TLB/IC). Additionally, during the second phase of the third cycle, the linear address is calculated for the data fetch instruction n−1 preceding the branch instruction n and instruction n−2 is executed (D(E)).

During the first phase of the fourth cycle, $t_3$–$t_4$ (shown by bracket 64), the branch instruction n and the predicted target instruction n+1 continue decoding in the second stage of jump decoder 31 and core decoder 21 respectively. The instruction n+2 following the target instruction also enters the first stage of decoding in core decoder 21. Also, during the second phase of the fourth cycle, the linear address of the branch instruction n is generated (ILAgen), and the linear address for the data fetch for instruction n+1 is generated (DLAgen). The physical address generation of the memory access and data cache fetch occur for the instruction n−1 (if needed) preceding the branch target instruction during both phases of the fourth cycle, and the instruction n−1 is executed (D(E)) by core execution unit 22.

During the first phase of the fifth cycle, $t_4$–$t_5$ (shown by bracket 65), the instruction n+3 begins decoding in the first stage of core decoder 21 while instruction n+2 continues decoding in the second stage. Also during the cycle, an instruction fetch occurs for the branch instruction n (TLB/IC). Physical address generation and a data cache fetch occur (if needed) for the predicted target instruction n+1 during the fifth cycle, and it is executed (D(E)) during the second phase of the fifth cycle. Additionally, during the second phase of the fifth cycle, jump execution unit 32 executes the branch instruction n (DJ). Therefore, during the same cycle, both the branch instruction n and the predicted target instruction n+1 are executed simultaneously. Finally, during the sixth cycle. $t_5$–$t_6$ (shown by bracket 66), the n+3 instruction continues in the second stage of decoding in core decoder 21.

The JMP execution time is presented in FIG. 6. The BTB hit column indicates a match (1) or miss (0) in the branch target buffer. The prediction column and the actual branch columns have no meaning since the branch is always predicted right. The last two columns compares the execution time in cycles for systems employing branch target buffers and folding forward to those systems which do not. As shown, when a match is found in the branch target buffer, the execution of the JMP instruction eliminates three cycles. Also, no penalty exists for using the branch target buffer with forward folding since the same number of cycles is required to execute a JMP instruction when no match exists in the branch target buffer.

The RET instruction timing flow is shown in FIG. 7. The RET instruction is normally executed in Intel's 486 microprocessor in five cycles, but the present invention employing a branch target buffer with forward folding can execute the RET instruction in two cycles with a correct prediction. Referring now to FIG. 7, the instruction n−2 that precedes the instruction which precedes the branch instruction is in the first stage of core decoder 21 (ID1) in execution core 20 during the first phase (PH1) of the first cycle, $t_0$–$t_1$ (shown by bracket 71).

During the first phase of the second cycle, $t_1$–$t_2$ (shown by bracket 72), the n−2 instruction continues decoding in the second stage of the core decoder 21 (ID2). Simultaneously, the instruction n−1 that precedes the branch instruction is in the first stage of core decoder 21. Also during the first phase of the second cycle, lookup mechanism 41 locates the branch set for the n−1 instruction in branch target buffer 42 to generate the predicted target instruction, n+1. Additionally, during the second phase (PH2) of the second cycle, the linear address is calculated (DLAgen) for the data fetch instruction n−2.

During the first phase of the third cycle, $t_2$–$t_3$ (shown by bracket 73), the instruction n−1 preceding the branch instruction continues decoding in the second stage of core decoder 21 (ID2). At the same time, the branch instruction n and the predicted target instruction n+1 begin initial decoding in the first stage of jump execution core 30 and execution core 20 respectively. Additionally, during the third cycle, physical address generation and a data cache fetch occur for the n−2 instruction. Also during the second phase of the third cycle, the linear address is calculated for the data fetch instruction n−1 preceding the branch instruction n and instruction n−2 is executed (D(E)).

During the first phase of the fourth cycle, $t_3$–$t_4$ (shown by bracket 74), the branch instruction n continues decoding in the second stage of jump decoder 31. Also, during the second phase of the fourth cycle, the linear address of the branch instruction n is generated (ILAgen). The physical address generation and data cache fetch occur for the instruction n−1 preceding the branch instruction n during both phases of the fourth cycle, and the instruction n−1 is executed (D(E)) by core execution unit 22.

During the fifth cycle, $t_4$–$t_5$ (shown by bracket 75), an instruction fetch occurs for the branch instruction n (TLB/IC). Also, during the first phase of the sixth cycle, $t_5$–$t_6$, the instruction n+2 begins decoding in the first stage of core decoder 21 while instruction n+1 continues decoding in the second stage. Additionally, during the second phase of the sixth cycle, the linear address of the branch instruction n is generated (ILAgen), and the linear address for data fetch instruction n+1 is generated (DLAgen).

During the first phase of the seventh cycle, $t_6$–$t_7$ (shown by bracket 77), the instruction n+3 begins decoding in the first stage of core decoder 21 while instruction n+2 continues decoding in the second stage. Also during the cycle, physical address generation and an instruction fetch occur for the branch instruction n (TLB/IC). Physical address generation and a fetch from the data cache occur for the predicted target instruction n+1 during the fifth cycle. Additionally, during the second phase of the fifth cycle, the linear address is generated for instruction n+2 and jump execution unit 32 executes the branch instruction n (DJ). Also during the second phase of the fifth cycle, target instruction n+1 is executed (D(E)) if the prediction was correct. If the prediction from the branch target buffer was wrong (because the return address was incorrect), then no operation (NOP) occurs, and during the next cycle the instruction at the new return address must begin its processing. Therefore, during the same cycle, both the branch instruction n and the predicted target instruction n+1 are executed simultaneously, if the prediction was correct.

Finally, during the eighth cycle, $t_7$–$t_8$ (shown by bracket 78), the n+4 instruction begins decoding in the first stage of decoding in core decoder 21, unless the prediction was incorrect. Also, physical address generation and a fetch to the data cache occur for the instruction n+2. If the prediction was incorrect, then the new instruction at the correct return address begins decoding in the first stage of core decoder 21, and no data fetch or physical address operation (NOP) occur.

The RET execution time is presented in FIG. 8. The BTB hit column indicates a match (1) or miss (0) in the branch target buffer. The prediction columns can be right or wrong because RET instructions can be to different calls. The last two columns compares the execution time in cycles for systems employing branch target buffers and folding forward to those systems which do not. As shown, when a match is found in the branch target buffer and the RET was for the individual call, the execution of the RET instruction eliminates three cycles. Also, no penalty exists for using the branch target buffer with forward folding when the RET was for another call since the same number of cycles is required to execute the RET instruction. Also note that when no match exists in the branch target buffer, no penalty exists when executing the RET instruction in a system employing a branch target buffer with forward folding or one that does not.

Although the preferred embodiment has only been shown to be implemented for three instructions, it is not so limited. Rather, it is limited only by the appended claims.

Thus, an instruction processor and method has been described which executes branch instructions in zero cycles.

We claim:

1. A pipeline instruction processor for executing instructions, said instructions stored in locations in an instruction memory, each of said locations being addressed by an instruction address, said instructions including a plurality of branch instructions, said instruction processor comprising:

first execution means for executing instructions, said first execution means including a first decode means for decoding said instructions and a first execution unit coupled to said first decode means for executing instructions decoded by said first decode means;

instruction prefetch means coupled with said first decode means for sequentially fetching instructions from said instruction memory, including an instruction prefetch buffer for buffering said instructions once sequentially fetched;

a branch target buffer coupled with said first decode means for storing a plurality of branch data sets, each of said plurality of branch data sets including an address of an instruction that immediately precedes a branch instruction, a predicted branch target instruction corresponding to the branch instruction, and a predicted branch target instruction address of the predicted branch target instruction;

logic means, coupled to said branch target buffer and said first decode means and responsive to each one of said instructions being decoded by said decode means, for searching said branch target buffer for one of said plurality of branch data sets to determine whether the instruction address of said one instruction matches the address of an instruction that immediately precedes a branch instruction, and if one of said plurality of branch data sets corresponds to the address of said one instruction, such that the instruction immediately following said one instruction is one of said plurality of branch instructions, then the predicted branch target instruction and the predicted branch target instruction address is fetched from said one of said plurality of branch data sets;

multiplexer means with first and second outputs, said multiplexer means being coupled and responsive to said logic means and coupled to said branch target buffer and said instruction prefetch means, for directing each one of said instructions from said instruction prefetch buffer through said first output to said first execution means via said first decode means, unless the predicted branch target instruction and its corresponding predicted branch target instruction address is fetched from the branch target buffer wherein said multiplexer means directs said one of said plurality of branch instructions to said second output and directs said predicted branch target instruction to said first output; and second execution means coupled to said second output for executing said one of said plurality of branch instructions, such that said second execution means branches to said predicted branch target address by executing said one of said plurality of branch instructions while said first execution means is executing said predicted branch target instruction.

2. The processor as in claim 1 wherein each of said plurality of branch data sets further includes history data and wherein said logic means generates said predicted branch target instruction and address according to said history data in said one of said plurality of branch data sets in said branch target buffer.

3. The processor as in claim 1 wherein said second execution means includes:

second decode means coupled to said second output for decoding said one of said plurality of branch instruction;

second execution means coupled to said second decoding means for executing said one of said plurality of branch instructions after being decoded by said second decode means.

4. A pipeline instruction processor for executing instructions, said instructions stored in locations in an instruction memory, each of said locations being addressed by an instruction address, said instructions including a plurality of branch instructions, said instruction processor comprising:

first execution means for executing instructions, said first execution means including a first decode means for decoding said instructions and a first execution unit coupled to said first decode means for executing instructions decoded by said first decode means;

instruction prefetch means coupled with said first decode means for sequentially fetching instruction from said instruction memory, including an instruction prefetch buffer for buffering said instructions once sequentially fetched;

a branch target buffer coupled with said first decode means for storing a plurality of branch data sets, each of said plurality of branch data sets including an address of an instruction that immediately precedes a branch instruction, a predicted branch target instruction corresponding to the branch instruction, a predicted branch target instruction address of the predicted branch target instruction, and history data indicating whether said branch instruction was taken previously;

logic means, coupled to said branch target buffer and said first decode means and responsive to each one of said instructions being decoded by said decode means, for searching said branch target buffer for one of said branch data sets to determine whether the instruction address of said one instruction matches the address of an instruction that immediately precedes a branch instruction, and if one of said plurality of branch data sets corresponds to the address of said one instruction, such that the instruction immediately following said one instruction is one of said plurality of branch instructions, then the predicted branch target instruction and the predicted branch target instruction address is fetched from said one of said plurality of branch data sets according to the history data in said one branch set;

multiplexer means with first and second outputs, said multiplexer means being coupled and responsive to said logic means and coupled to said branch target buffer and said instruction prefetch means, for directing each one of said instructions from said instruction prefetch buffer through said first output to said first execution means via said first decode means, unless the predicted branch target instruction and its corresponding predicted branch target instruction address is fetched from the branch target buffer wherein said multiplexer means directs said one of said plurality of branch instructions to said second output and directs said predicted branch target instruction to said first output; and second execution means for executing said one of said plurality of branch instructions, said second execution means including a second decode means coupled to said second output for decoding said one of said plurality of branch instructions and a second execution unit coupled to said second decode means for executing said one of said plurality of branch instructions decoded by said second decode means, such that said second execution means branches to said predicted branch target address by executing said one of said plurality of branch instructions while said first execution means is executing said predicted branch target instruction.

5. The processor as in claim 4 wherein said first execution means further comprises branch set creation means for generating a new branch set each time said first execution means executes a branch instruction and for storing said new branch set in said branch target buffer.

6. The processor as in claim 5 wherein an actual branch target instruction and an actual branch target instruction address are associated with said one of said plurality of branch instructions and wherein said second execution means further comprises comparing means for generating the actual branch target instruction for said one of said plurality of branch instructions and comparing said actual branch target instruction with said predicted branch target instruction fetched from said branch target buffer and for comparing the actual branch target address of said actual branch target instruction to which branching occurred with said predicted branch target address from said branch target buffer, if either said actual branch target instruction is not identical to said predicted branch target instruction from said branch target buffer or said actual branch target instruction address is not identical to said predicted branch target instruction address, said comparing means sends a halt signal to said first execution means and a fetch signal to said instruction prefetch means indicating that said instruction prefetch means is to fetch said actual branch target instruction at said actual branch target instruction address.

7. The processor as in claim 6 wherein said first execution means further comprises abort means responsive to said halt signal from said comparing means such that execution of said predicted branch target instruction is aborted.

8. The processor as in claim 7 further comprising branch target buffer replacement means for replacing one of said plurality of branch data sets in said branch target buffer with said new branch set when said branch target buffer is full of said plurality of branch data sets.

9. A method of performing branches with a pipeline instruction processor, which executes instructions, said instructions located in an instruction memory and fetched from said instruction memory into a prefetch buffer by a prefetch unit, said instructions including a plurality of branch instructions, said instruction processor comprising first and second execution units and a branch target buffer containing a plurality of branch data sets, each of said plurality of branch data sets including an address of an instruction that precedes a branch instruction address of a branch instruction, a predicted branch target instruction corresponding to the branch instruction, a predicted branch target instruction address of said predicted branch target instruction, and data indicating whether said branch instruction was taken previously, said method comprising the steps of:

(a) fetching one of the instructions from said prefetch buffer, wherein said one instruction precedes one of said plurality of branch instructions;

(b) decoding said one instruction and searching said branch target buffer for a branch data set indexed to the address of said one instruction, and wherein if said one of said plurality of branch data sets is located, such that said one instruction immediately precedes said one of said plurality of branch instructions then fetching the predicted branch target instruction and the predicted branch target instruction address from said one of said plurality of branch data sets;

(c) sending said one of said plurality of branch instructions to the second execution unit and the predicted branch target instruction to said first execution unit;

(d) executing said one instruction in said first execution unit while decoding said one of said plurality of branch instructions in said second execution unit and said predicted branch target instruction in said first execution unit; and (e) executing said one of said plurality of branch instructions in said second execution unit and said predicted branch target instruction in said first execution unit such that said predicted branch target instruction is executed in a cycle concurrently with the execution of said one of said plurality of branch instructions.

10. The method according to claim 9 further including the steps of:

generating an actual branch target instruction and actual branch target instruction address of said actual branch target instruction for said branch instruction;

comparing said actual branch target instruction with said predicted branch target instruction fetched from said branch target buffer; and comparing the actual branch target instruction address of said actual branch target instruction to which branching occurred with said predicted branch target address from said branch target buffer, and if said actual branch target instruction is identical to said predicted branch target instruction from said branch target buffer and said actual branch target instruction address is identical to said predicted branch target instruction address then said prefetch unit continues execution of instructions at the address location following the predicted branch target instruction address of said predicted branch target instruction address.

11. A method of executing first and second branch instructions successively with a pipeline instruction processor, which cyclically executes instructions, said instructions located in an instruction memory and fetched from said instruction memory into a prefetch buffer by a prefetch unit, said instructions including a first branch instruction and a second branch instruction, said first branch instruction preceding said second branch instruction in said instruction memory, said instruction processor comprising first and second execution units and a branch target buffer containing a plurality of branch data sets, each of said plurality of branch data sets including an address of an instruction that precedes a branch instruction address of a branch instruction, a predicted branch target instruction corresponding to the branch instruction, a predicted branch target instruction address of said predicted branch target instruction, and data indicating whether said branch instruction was taken previously, said method comprising the steps of:

(a) fetching one of said instructions from said prefetch buffer, wherein said one instruction precedes said first branch instruction;

(b) decoding said one instruction and searching said branch target buffer for a first branch set indexed to the address of said one instruction, and if said first branch set is located, such that said searching indicates that said first branch instruction follows said one instruction, then generating a first predicted branch target instruction and a first predicted branch target instruction address from said first branch set for said first branch instruction;

(c) sending said first branch instruction to the second execution unit and the first predicted branch target instruction to the first execution unit;

(d) executing said one instruction in said first execution unit while decoding said first branch instruction and said first predicted branch target instruction and searching said branch target buffer for a second branch set indexed to the address of said first branch instruction, and if said second branch instruction is located, such that said searching indicates that said second branch instruction follows said first branch instruction, then generating a second predicted branch target instruction and a second predicted branch target address from said second branch set;

(e) executing said first branch instruction while decoding said second predicted branch target instruction in said first execution unit and said second branch instruction in said second execution unit; and (f) executing said second branch instruction in said second execution unit and said second predicted target instruction in said first execution unit such that said second predicted branch target instruction is executed while said second execution unit executes said second branch instruction.

* * * * *